US008155117B2

(12) United States Patent
Babbar et al.

(10) Patent No.: US 8,155,117 B2
(45) Date of Patent: Apr. 10, 2012

(54) FILTERING AND ROUTING OF FRAGMENTED DATAGRAMS IN A DATA NETWORK

(75) Inventors: Uppinder S. Babbar, San Diego, CA (US); Marcello Lioy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 988 days.

(21) Appl. No.: 10/881,451

(22) Filed: Jun. 29, 2004

(65) Prior Publication Data

US 2005/0286517 A1 Dec. 29, 2005

(51) Int. Cl.
*H04L 12/28* (2006.01)
*H04L 12/56* (2006.01)
(52) U.S. Cl. .................. 370/389; 370/392; 370/394
(58) Field of Classification Search .............. 370/252, 370/392, 389, 394, 382, 390, 395.31, 395.52, 370/400, 401
See application file for complete search history.

(56) References Cited

U.S. PATENT DOCUMENTS

| | | | | |
|---|---|---|---|---|
| 6,084,859 | A * | 7/2000 | Ratcliff et al. ............. | 370/252 |
| 6,654,359 | B1 * | 11/2003 | La Porta et al. ............ | 370/328 |
| 6,674,769 | B1 * | 1/2004 | Viswanath .................. | 370/469 |
| 6,798,788 | B1 * | 9/2004 | Viswanath et al. .......... | 370/469 |
| 6,956,853 | B1 * | 10/2005 | Connery et al. ............. | 370/392 |
| 7,319,674 | B2 * | 1/2008 | Chandra et al. ............. | 370/252 |
| 7,352,731 | B1 * | 4/2008 | Leung ......................... | 370/338 |
| 7,403,999 | B2 | 7/2008 | Corl, Jr. et al. | |
| 2001/0048681 | A1 * | 12/2001 | Bilic et al. .................. | 370/389 |
| 2002/0161915 | A1 * | 10/2002 | Crow et al. ................. | 709/236 |
| 2002/0191604 | A1 * | 12/2002 | Mitchell et al. ............. | 370/389 |
| 2003/0018591 | A1 | 1/2003 | Komisky ..................... | 706/1 |
| 2003/0081592 | A1 * | 5/2003 | Krishnarajah et al. ...... | 370/352 |
| 2003/0126272 | A1 * | 7/2003 | Corl et al. ................... | 709/230 |
| 2004/0013112 | A1 * | 1/2004 | Goldberg et al. ........... | 370/389 |
| 2004/0064688 | A1 * | 4/2004 | Jacobs ........................ | 713/150 |
| 2004/0093425 | A1 * | 5/2004 | Thomas ...................... | 709/236 |
| 2006/0072617 | A1 * | 4/2006 | Kaundinya Mutnuru et al. .......................... | 370/474 |

(Continued)

FOREIGN PATENT DOCUMENTS

EP 0743777 11/1996

(Continued)

OTHER PUBLICATIONS

Ziemba G. et al.: "Security Consideration for IP Fragment Filtering" Network Working Group, Request for Comments, Oct. 1995.

(Continued)

*Primary Examiner* — Chi Pham
*Assistant Examiner* — Farah Faroul
(74) *Attorney, Agent, or Firm* — Howard H. Seu; Kristine U. Ekwueme (57) ABSTRACT

Techniques to efficiently filter fragmented datagrams and route fragments are described. For each fragmented datagram, a filtering node obtains filter parameters as fragments for the datagram are received. When all filter parameters are available, the node applies one or more filters on the filter parameters to obtain a filter result for the datagram and stores the filter result in an entry in a routing table. Prior to obtaining the filter result, the node stores all fragments received for the datagram in a memory. When the filter result becomes available, the node processes all fragments already received for the datagram in accordance with the filter result. As each remaining fragment for the datagram is received, the node immediately processes the fragment in accordance with the filter result. When the last fragment is received, the node clears the memory and the routing table entry for the datagram.

41 Claims, 6 Drawing Sheets

U.S. PATENT DOCUMENTS

2007/0070908 A1* 3/2007 Ghosh et al. .................. 370/236
2008/0025308 A1* 1/2008 Morgan et al. ................ 370/392

FOREIGN PATENT DOCUMENTS

| EP | 1345361 | 9/2003 |
| EP | 1357722 | 10/2003 |
| JP | 2002271071 | 9/2002 |
| JP | 2003143208 | 5/2003 |

OTHER PUBLICATIONS

International Search Report—PCT/US2010/023660, International Search Authority—European Patent Office—May 21, 2010.
Written Opinion—PCT/US2005/023660, International Search Authority, European Patent Office, Nov. 25, 2005.

* cited by examiner

FILTERING AND ROUTING OF FRAGMENTED DATAGRAMS IN A DATA NETWORK

BACKGROUND

I. Field

The present invention relates generally to data communication, and more specifically to techniques for filtering and routing fragmented datagrams in a data network.

II. Background

Internet Protocol (IP) is a protocol that supports transmission of blocks of data, called datagrams, from sources to destinations in a packet-switched data network. The sources and destinations are hosts that are identified by fixed length IP addresses. In IP terminology, a "node" is a device that implements IP, a "host" is a node that terminates IP packets explicitly addressed to itself, and a "router" is a host that also forwards IP packets not explicitly addressed to itself. To transmit data to a destination, a source forms a datagram with an IP header and a payload portion. The IP header contains the IP addresses of the source and destination as well as other fields. The source then sends the datagram as an IP packet towards the destination based on routing information the source has for the destination.

A node may filter IP packets for various reasons, as described below. In the context of IP, "filtering" is a process to identify different types of IP packets based on certain characteristics of the IP packets. These characteristics are described or defined by one or more filter parameters, which may be carried in the IP header or the payload portion. In a protocol stack, IP resides at a network layer, which is below a transport layer, which in turn is below an optional session layer that is below an application layer. A data network may use a Transmission Control Protocol (TCP), a User Datagram Protocol (UDP), or some other protocol for the transport layer. The filter parameters may be carried in the IP header, a transport layer header (e.g., a TCP header), a session layer header, an application layer header, an application layer payload, and so on, or a combination thereof, all of which are encapsulated in the datagram.

In the context of IP, a "filter" may be viewed as a box that provides different outputs for different values of the filter parameters. As an example, a filter may be defined based on a destination IP address and a TCP destination port number of 23. (A TCP port refers to a logical channel for the associated data.) This filter may be used to identify all IP packets destined for a telnet server running on a host with that destination IP address. In general, filtering may be performed to differentiate certain IP packets from a stream of IP packets based on the characteristics defined by the filter parameters. The filtering allows for special handling of IP packets having these characteristics.

IP packet filtering is more challenging in the presence of IP fragmentation. IP supports fragmentation of datagrams into smaller fragments. IP fragmentation may be used, for example, if a datagram to be sent is too large to be carried by a protocol unit at a layer below the network layer. In this case, the large datagram may be divided into multiple smaller fragments, and each fragment may be sent as a separate IP packet. The IP packets for the fragments would contain appropriate header information that may be used by the destination to re-assemble these fragments.

If a datagram is divided into multiple fragments, then the filter parameters may be carried in only one fragment or a subset of the fragments, which then complicates IP packet filtering. For example, the filter parameters may be the source and destination port numbers in a TCP header, which is typically carried in the first fragment of a datagram. If a filtering node performs filtering separately on each IP packet, then IP packets that do not contain all of the filter parameters cannot be filtered properly. A filtering node is a node that performs IP packet filtering and may be a host or a router.

In one conventional scheme for filtering fragmented datagrams, a filtering node buffers all of the fragments of a datagram, re-assembles the datagram after all of the fragments have been received, performs filtering on the re-assembled datagram, and (if necessary) re-fragments the datagram into fragments and sends out the fragments as separate IP packets. This conventional filtering scheme has several disadvantages. First, prolonged buffering of all of the fragments of each datagram interrupts the normal flow of these fragments, introduces extra delays in the transmission of the datagram to its final destination, and may further cause uneven link usage. Second, the re-assembly and re-fragmentation of each datagram require additional processing by the filtering node. If the filtering node is a router, then the re-assembly and re-fragmentation would make routing very inefficient.

To reduce the amount of processing, the filtering node may perform filtering on fragmented datagrams without re-assembling the fragments of the datagrams. However, the node may still need to buffer all fragments of each datagram and apply the filter only after all fragments have been received. The disadvantages associated with prolonged buffering would still apply for this case.

There is therefore a need in the art for techniques to efficiently filter and route fragmented datagrams.

SUMMARY

Techniques for efficiently filtering fragmented datagrams and routing fragments for these datagrams are described herein. For each fragmented datagram, which is identified by a unique datagram identifier, a filtering node obtains filter parameters for the datagram as fragments of the datagram are received. When all of the filter parameters for the datagram are available, the node applies one or more filters on the filter parameters, obtains a filter result for the datagram, and stores the filter result in an entry in a routing table (i.e., a routing table entry) for the datagram. The filter result (which may also be called a routing decision) indicates the processing to be performed by the node for all fragments of that datagram. For example, the filter result may indicate whether the node should pass fragments for the datagram to a higher layer, forwards the fragments to the destination for the datagram, forward the fragments on to a specific logical or physical link towards the destination of the datagram, purge all fragments for the datagram, and so on. The filter result is obtained based on the one or more filters, which are typically designed for a specific application.

Prior to obtaining the filter result, the filtering node stores all fragments received for the datagram in a "fragment" memory, which may be any memory suitable for storing data. When the filter result becomes available, the node can process all fragments already received for the datagram in accordance with the filter result. As each remaining fragment for the datagram is subsequently received, the node can immediately process the fragment in accordance with the filter result stored for the datagram. When the last fragment for the datagram is received, the node can clear the portion of the fragment memory used by the datagram and purge the routing table entry for the datagram.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

For clarity, the following terminology is used in the description below. The network layer may receive data from a higher layer (e.g., the transport layer) and form Internet datagrams (or simply, datagrams). The network layer may also receive IP datagrams from other network elements via one of its network interfaces for processing or forwarding via one of its remaining network interfaces. A datagram may be processed and sent as a single IP packet at the network layer. A datagram may also be partitioned into multiple fragments, and each fragment may be sent as a separate IP packet at the network layer. Each IP packet may thus be for an entire unfragmented datagram or for one fragment of a fragmented datagram. Each IP packet includes an IP header and a payload portion.

Figure 1:
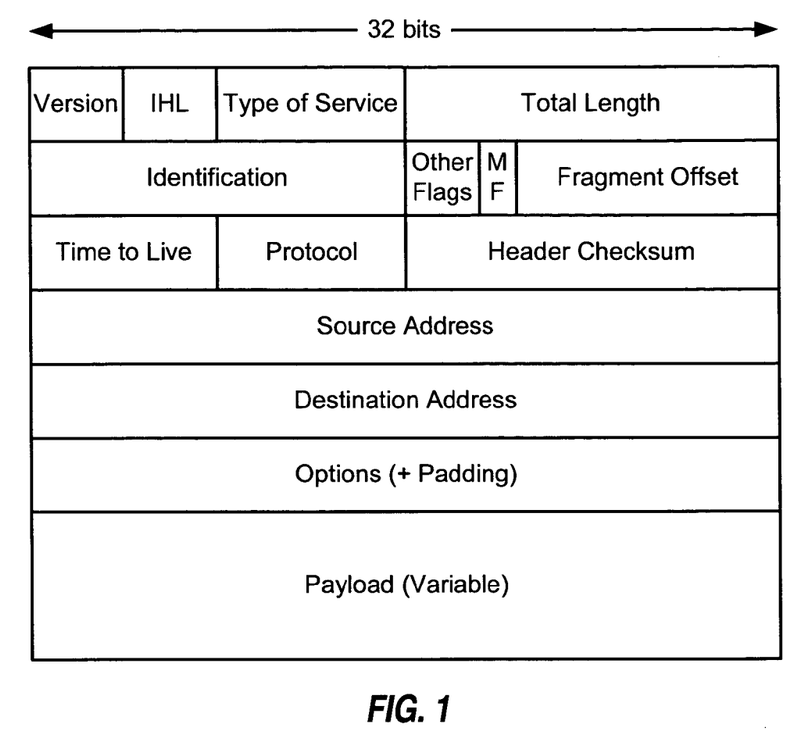
FIG. 1 shows an IP packet for a datagram.

FIG. 1 shows an IP packet for a datagram. The IP packet includes a number of fields and, for simplicity, only the fields that are pertinent to the present disclosure are described below.

Internet Header Length (IHL)—indicates the length of the IP header (in units of 32-bit words).

Total Length—indicates the total length of the IP packet, including the IP header and the payload portion (in units of 8-bit octets).

Identification—carries an identification value assigned by a source host to aid in the re-assembly of fragments (if any) for the datagram.

Flags—contains three bits, with an MF bit being set to "0" to indicate the last fragment for the datagram and to "1" to indicate one or more fragments to follow for the datagram.

Fragment Offset—indicates the position of the fragment in the datagram, which allows a destination host to properly re-assemble fragments of the datagram.

Time to Live—indicates the maximum time the datagram is allowed to remain in an IP data network.

Protocol—indicates the next higher layer protocol used in the payload portion of the IP packet.

Source Address—carries the IP address of the source host.

Destination Address—carries the IP address of the destination host.

Payload—carries the payload for the IP packet and is of variable length.

The IP packet format is described in RFC 791, entitled "Internet Protocol DARPA Internet Program Protocol Specification," September 1981. Other protocols for other layers also define formats for their data units. For example, at the transport layer, the format used by TCP is described in RFC 793, entitled "Transmission Control Protocol," September 1980, and the format used by UDP is described in RFC 768, entitled "User Datagram Protocol," August 1980.

Figure 2:
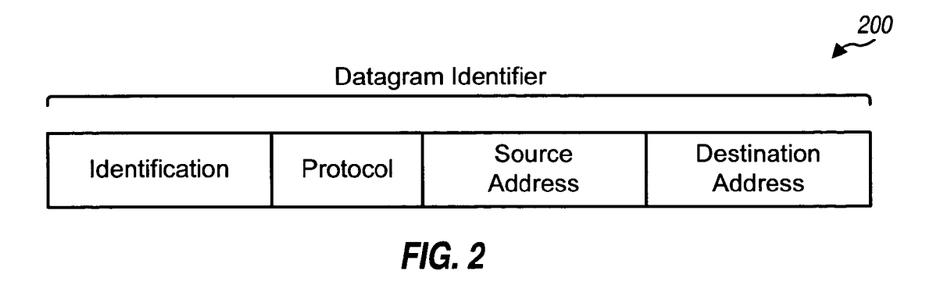
FIG. 2 shows the fields of an exemplary datagram identifier.

FIG. 2 shows the fields of an exemplary datagram identifier 200 used to uniquely identify each datagram. Datagram identifier 200 is formed by concatenating the Identification, Protocol, Source Address, and Destination Address fields of the IP header. RFC 791 requires the source host to set the Identification field to a value that is unique for both (1) a given combination of source IP address, destination IP address, and protocol used for the datagram and (2) the time that the datagram will be active in the data network. The same identification value is used for all fragments of a given datagram. Thus, all IP packets with the same set of values for these four fields may be considered as belonging to the same datagram. In a common implementation, the source host randomly selects a value for the Identification field when it starts sending datagrams and thereafter increments the identification value whenever it sends a new datagram (regardless of the protocol). In this case, a datagram identifier may be defined by a concatenation of just the Identification, Source Address, and Destination Address fields.

Figure 3:
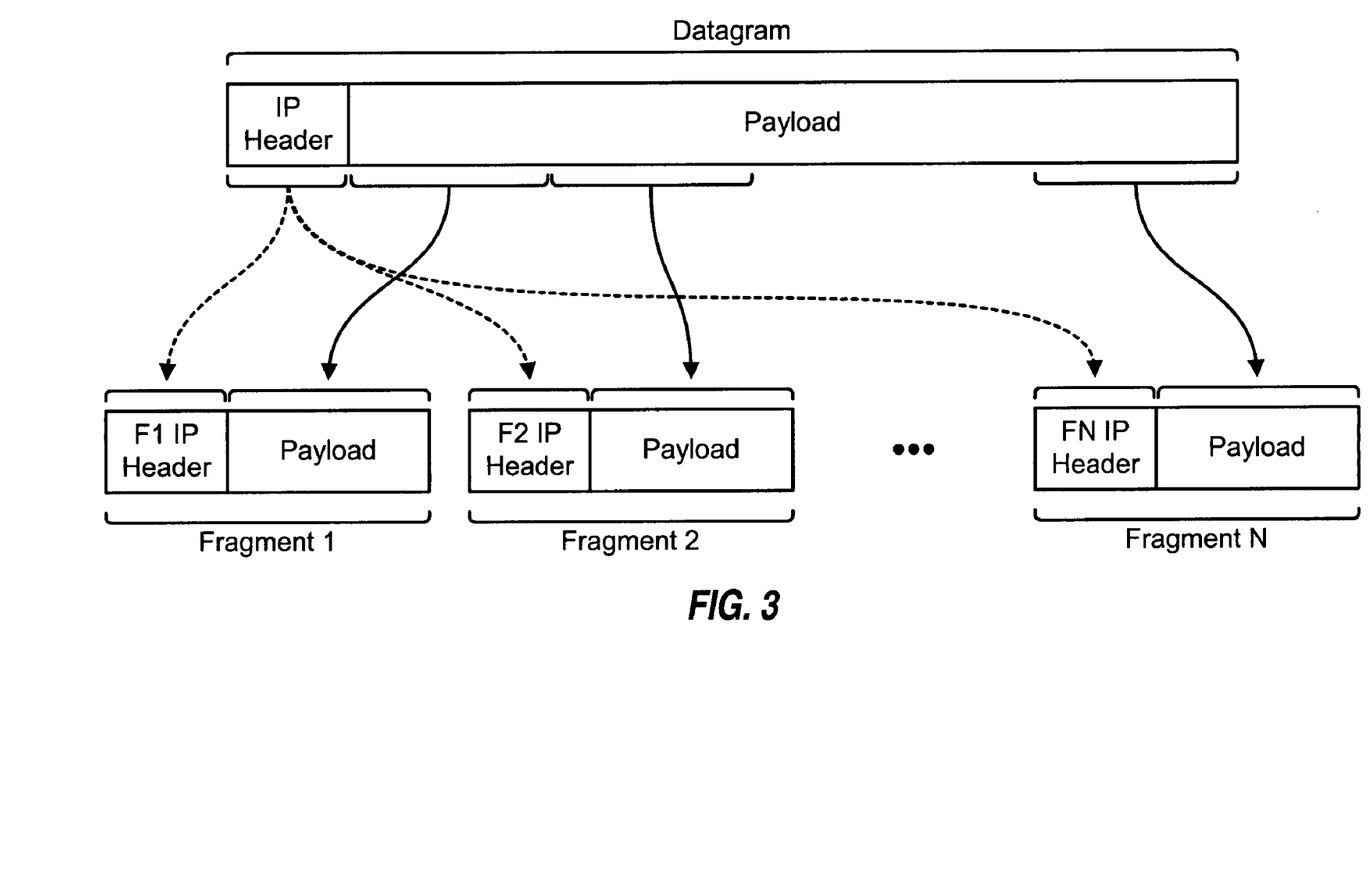
FIG. 3 shows fragmentation of a datagram into multiple fragments.

FIG. 3 shows fragmentation of a datagram into multiple fragments. The original datagram comprises an IP header and a payload portion, and may be larger than the data-carrying capacity of a data unit in a lower layer (e.g., a link layer). If the payload portion of the datagram contains M octets and if each data unit in the lower layer can carry L octets plus the IP header, then the datagram may be partitioned into $\lceil M/L \rceil$ fragments, where $\lceil x \rceil$ denotes a ceiling operator that gives the next higher integer for x. Since RFC 791 requires the payload portion of the datagram to be partitioned on an 8-octet boundary, more than $\lceil M/L \rceil$ fragments may be required for the datagram. The datagram may be partitioned into N fragments, which are labeled as fragments 1 through N, where N may be equal to or greater than $\lceil M/L \rceil$.

To fragment the datagram, the IP header for each of the N fragments is generated using the IP header of the datagram. New values for the Total Length, Fragment Offset, and Flag fields are determined for the IP header of each fragment. The remaining fields of the IP header of each fragment are copied from the original IP header of the datagram. Options from the original IP header are only copied to the IP header of the first fragment. Finally, the IP header checksum for each fragment is recalculated. The payload portion of the datagram is partitioned into N smaller parts at the appropriate 8-octet boundary. The payload portion of each fragment is filled with a corresponding one of the N parts. The MF bit in the Flags field of the IP header for each of fragments 1 through N−1 is set to "1" to indicate that one or more fragments will follow for the datagram. The MF bit for fragment N is set to "0" to indicate that this fragment is the last fragment for the datagram. The Fragment Offset field for each fragment is set to a value that indicates the starting position of the payload portion in that fragment relative to the start of the payload portion in the datagram. The Total Length field is set to the length of fragment.

The source host sends the N fragments for the datagram as N separate IP packets, typically one IP packet at a time, over the data network. Because these IP packets may be sent via different routes, a given node may receive these IP packets out of sequence. In the following description, "fragment 1" refers to the first fragment of the datagram, and the "first received fragment" refers to the first fragment received for the datagram, which may or may not be fragment 1.

A filtering node may efficiently perform filtering on fragmented datagrams and routing of fragments for these datagrams in the following manner. For each fragmented datagram, the node obtains filter parameters for the datagram as fragments of the datagram are received. As soon as all of the filter parameters for the datagram are available, the node applies one or more filters on the filter parameters, obtains a filter result for the datagram, and stores the filter result in an entry (or row) in a routing table. The filter result indicates the processing to be performed by the node for all fragments of the datagram. Prior to obtaining the filter result, the node stores all fragments received for the datagram in a fragment memory. As soon as the filter result becomes available, the node can process all fragments already received for the datagram in accordance with the filter result. As each remaining fragment for the datagram is subsequently received, the node can immediately process the fragment in accordance with the filter result. When the last fragment for the datagram is received, the node can clear the portion of the fragment memory used by the datagram and purge the routing table entry for the datagram.

The fragments of a datagram may be stored in various manners in the fragment memory before the routing result becomes available. Since the sizes of the fragments may not be known a priori and the fragments may be received out of sequence, each fragment may be stored in a separate buffer as the fragment is received. A buffer may be a portion of the fragment memory, of the proper size, which is allocated as needed. This allows for efficient use of the fragment memory since a buffer of the proper size may be allocated if and when the buffer is needed. A mechanism may be used to (1) determine which fragments of the datagram have been received, (2) the buffers where the received fragments are stored, and (3) other pertinent information, if any, for the datagram. This mechanism may be implemented, for example, with a queue list, a linked list, and so on, as is known in the art. The following description assumes that fragments are stored in separate buffers. However, the fragments may also be stored in other manners, and this is within the scope of the invention.

In general, the filter parameters for each fragmented datagram may be carried in one or more fragments, which are referred to as "target" fragments. However, many applications use filter parameters that are carried in the IP header and/or a header for an upper layer protocol such as TCP, UCP, ICMP, and so on. Since the minimum size of a fragment is 576 octets, the IP header and upper layer headers are typically carried in fragment 1 of a datagram. For applications that use filter parameters carried in the IP header and upper layer headers, there is typically only one target fragment, which is normally fragment 1 of the datagram. For these applications, all of the filter parameters for a datagram may be obtained from fragment 1 of the datagram, which is typically also the first received fragment for the datagram, and a filter result may be obtained for the datagram based on the first received fragment. All subsequent fragments for the datagram may be processed as they are received without having to buffer these fragments.

A filtering node may use a timer for each fragmented datagram to ensure that fragments for "stale" datagrams are purged from the fragment memory. The timer for each datagram may be set to an initial value when the first fragment is received for the datagram. This initial value may be, for example, the Time to Live value in the IP header of the fragment. When the timer expires, the routing table entry for the datagram may be deleted, and all fragments stored in the fragment memory for the datagram may be purged, thus clearing the portion of the fragment memory used by the datagram.

The filtering node may perform the following overhead processing for different fragments of a fragmented datagram:

First received fragment for the datagram—create an entry for the datagram in the routing table and start the timer for the datagram;

Target fragment(s)—obtain all of the filter parameters for the datagram and apply at least one filter on the filter parameters to obtain a filter result for the datagram; and Last fragment for the datagram—clear the portion of the fragment memory used by the datagram and purge the routing table entry for the datagram.

Figure 4:
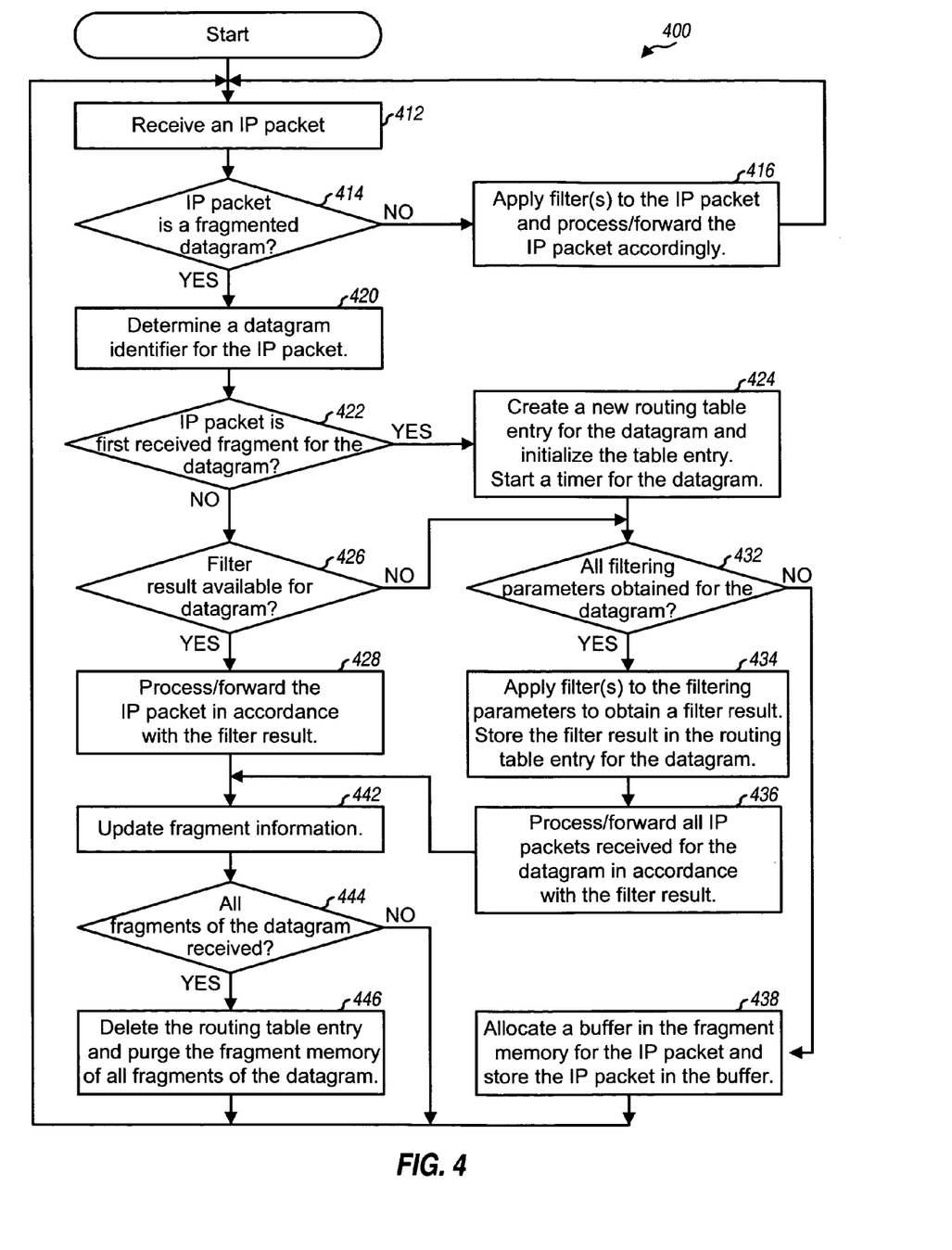
FIG. 4 shows a process performed by a filtering node to filter a fragmented datagram and to route fragments of the datagram.

FIG. 4 shows a flow diagram of a process 400 performed by a filtering node to filter a fragmented datagram and to route fragments of the datagram. A fragmented datagram is composed of multiple fragments, and each fragment is sent as one IP packet. Thus, "fragments" and "IP packets" are synonymous terms for a fragmented datagram. FIG. 4 shows the processing for one IP packet.

Initially, the filtering node receives an IP packet (block 412). The node then determines whether the IP packet is a fragmented datagram (block 414). This may be achieved by examining the MF bit and the Fragment Offset field in the IP header of the IP packet. The IP packet is an unfragmented datagram if the Fragment Offset field is set to 0 (which is only true for fragment 1) and the MF bit is set to "0" (indicating that no other fragment will follow for the datagram). If the IP packet is an unfragmented datagram (i.e., the answer is 'no' for block 414), then the node applies one or more filters on the IP packet and processes and/or forwards the IP packet based on the outcome of the filtering (block 416). The node then returns to block 412 to process the next IP packet.

If the current IP packet is a fragmented datagram, as determined in block 414, then the filtering node determines whether this IP packet is the first fragment received for the datagram, which may or may not be fragment 1 of the datagram since the node may receive fragments out of sequence (block 422). This determination may be made by (1) obtaining the datagram identifier, e.g., as a concatenation of the Identification, Protocol, Source Address, and Destination Address values in the IP header of the IP packet, (2) looking up the routing table entries for this datagram identifier, and (3) indicating the current IP packet to be the first received fragment if the datagram identifier is not found in any of the routing table entries.

If the current IP packet is the first received fragment, then the filtering node creates a new routing table entry for the datagram, initializes the fields of the new routing table entry, and starts a timer for the datagram (block 424). The routing table entry for the datagram is indexed by the datagram identifier. The routing table entry includes a pointer, which points to the fragment memory location used to store the fragments for the datagram. The node then proceeds to block 432.

If the current IP packet is not the first received fragment, as determined in block 422, then the filtering node determines whether a filter result for the datagram is available in the routing table entry for the datagram (block 426). If the filter result exists, then the node processes/forwards the IP packet in accordance with the filter result (block 428) and then proceeds to block 442. Otherwise, if the filter result is not available, then the node determines whether all filter parameters for the datagram have been obtained from the current IP packet and all IP packets already received which are also fragments of this datagram (block 432). If all filter parameters have not been obtained, then the node allocates a buffer in the fragment memory for the current IP packet and stores the IP packet in the buffer (block 438). The node then returns to block 412 to process the next IP packet. Otherwise, if all filter parameters have been obtained, then the node applies the filter(s) on the filter parameters, obtains a filter result for the datagram, and saves the filter result in the routing table entry created for the datagram (block 434). The node then processes/forwards the current IP packet as well as all IP packets already received, which are also fragment of this datagram and are stored in the fragment memory, in accordance with the filter result (block 436). The node then proceeds to block 442.

For the embodiment shown in FIG. 4, the filtering node also keeps track of which fragments have been received for the datagram and updates this information whenever a new fragment is received for the datagram (block 442). The node may perform this record keeping based on the fragment offset of each fragment (which is obtained from the Fragment Offset field) and the payload size of each fragment (which is obtained based on the IHL and Total Length fields). The node then determines whether all fragments of the datagram have been received based on the updated fragment information (block 444). The entire datagram is received if (1) the last fragment for the datagram has been received (the last fragment has the MF bit set to "0") and (2) all other fragments for the datagram have also been received (which may be determined based on the fragment offset and payload size of each received fragment). If the entire datagram has been received, then the node deletes the routing table entry for the datagram and purges all of the fragments of the datagram from the fragment memory (block 446). From blocks 444 and 446, the node returns to block 412 to process the next IP packet.

In another embodiment, instead of deleting the routing table entry for the datagram and clearing the fragment memory used by the datagram in block 446, the filtering node simply forces the timer for the datagram to expire in block 446. A timer handling mechanism would then delete the routing table entry and clear the fragment memory used by this datagram since its timer has expired, as described below. In yet another embodiment, the filtering node does not keep track of fragment information and does not perform the processing shown in blocks 442, 444, and 446. For this embodiment, the filtering node relies on the timer handling mechanism to delete the routing table entries and purge the fragments in fragment memory for old datagrams when their timers naturally expire.

As shown in FIG. 4, fragments for a datagram are temporarily stored in buffers in the fragment memory until all of the filter parameters for the datagram are received and a filter result can be obtained for the datagram. If all of the filter parameters are carried in fragment 1 of the datagram, then the filter result can be obtained as soon as fragment 1 is received, which is typically the first received fragment for the datagram unless the fragments are received out of sequence. In this case, routing delay and buffering requirement are both minimized for the datagram. Furthermore, fragment 1 can be easily identified by a value of 0 for the Fragment Offset field.

If all of the filter parameters are not carried in fragment 1, then routing delay and buffering requirement both increase in proportion to the delay required by the node to acquire all of the required filter parameters. Furthermore, if multiple fragments are needed to obtain all of the filter parameters, then the filter parameters would also need to be temporarily stored as they are received until such time that the filter(s) can be applied. Appropriate processing is performed to detect for the target fragment(s) that carry the required filter parameters.

Efficient filtering may be achieved by designing filters to use parameters that are expected to be available in only one fragment (to avoid having to buffer the filter parameters) and preferably in fragment 1 (to avoid having to buffer the fragments). If the source host is aware of the filtering being performed by the filtering node, then the source host may send the fragments in a manner such that the filtering node can receive all of the filter parameters as soon as possible. For example, the source node may send the fragments out of sequence, with the fragments carrying the filter parameters being sent first. In general, the filters may be defined and/or the fragments may be sent such that routing delay and buffering requirement can be minimized to the extent possible.

The filtering node buffers the fragments of a datagram in buffers until a filter result is obtained for the datagram. Some fragments may be dropped or corrupted while transitioning through the data network (for whatever reasons) and may not be received by the node. If a fragment containing a required filter parameter is dropped, then a filter result cannot be obtained for the datagram, and all fragments received for the datagram may sit in the fragment memory indefinitely unless and until the fragment memory is cleared by some mechanism. Even if a filter result is obtained for the datagram, any dropped fragment will result in a failure to receive the entire datagram, and the routing table entry for the datagram may be retained indefinitely unless the routing table entry is deleted by some mechanism.

A timer may be used for each datagram to avoid the situations in which the routing table entry and/or the buffers for the datagram are retained indefinitely, e.g., because a fragment is dropped by the data network. The timer is set to an initial value when the first fragment is received for the datagram. This initial value should be large enough so that the node does not prematurely delete the routing table entry or any outstanding fragments already received for the datagram. This initial value should also be equal to or smaller than the time it takes for the value in the Identification field to wrap around, so that the filter result obtained for one datagram is not erroneously applied to another datagram with the same identification value. The initial value may be set to the value in the Time to Live field of the IP header, for example, or to some other time value.

Figure 5:
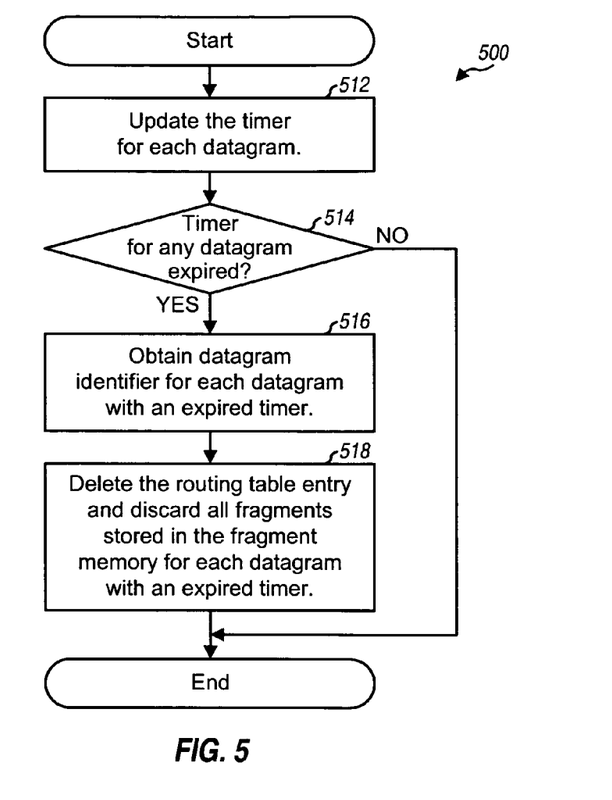
FIG. 5 shows a process for handling timers for fragmented datagrams.

FIG. 5 shows a flow diagram of a process 500 for handling the timers for fragmented datagrams. A timer for a fragmented datagram is set when the first fragment is received for the datagram, as shown in FIG. 4. Thereafter, the timer is updated (e.g., decremented) by the amount of time that has elapsed since the last update. Once the timer expires, the datagram is considered "stale" and all fragments received for the datagram and its routing table entry can be purged. This prevents accumulation of old fragmented datagrams in the fragment memory.

The node updates the timer for each fragmented datagram, e.g., periodically or when triggered by an event (block 512). The node then determines whether the timer for any datagram has expired (block 514). If the answer is 'yes', then the node obtains the datagram identifier for each stale datagram with an expired timer (block 516). The node then deletes the routing table entry for each stale datagram and discards all fragments stored in the fragment memory for the stale datagram (block 518). Discarding stale and/or incomplete datagrams is not catastrophic since a protocol in a higher layer will likely perform the appropriate corrective action, e.g., initiate retransmission of the missing datagrams.

Process 500 may be performed periodically, e.g., every predetermined number of seconds. Process 500 may also be performed when triggered, e.g., after the processing of each received IP packet.

Figure 6:
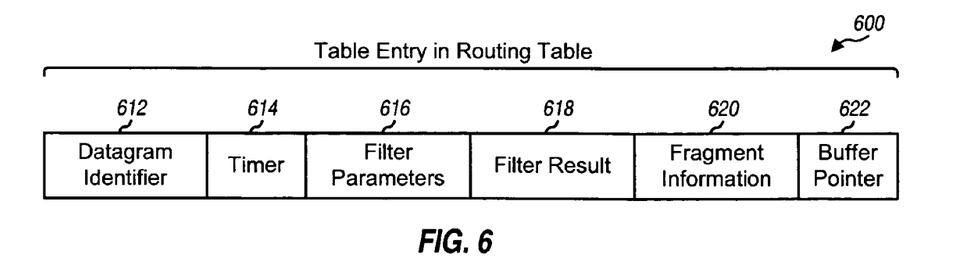
FIG. 6 shows a routing table entry for a fragmented datagram.

FIG. 6 shows an embodiment of a table entry 600 in the routing table for a fragmented datagram. For this embodiment, a field 612 stores the datagram identifier, which may be formed from the fields in the IP header of the first received fragment for the datagram, as described above. The routing table entry is indexed by the datagram identifier. A field 614 stores the timer for the datagram, which is set to a predetermined value when the routing table entry is created and is thereafter updated, e.g., periodically or when triggered by an event.

A field 616 stores the filter parameters already received for the datagram. If all of the filter parameters are carried in one fragment, then the filter(s) may be applied and the filter result may be obtained when this fragment is received. In this case, field 616 is not used. However, if all of the filter parameters for the datagram are carried in multiple fragments, then filter parameters may be stored in field 616 as they are received, and the filter(s) may be applied once all of the filter parameters have been received. Field 616 may be consulted for the determination in block 432 in FIG. 4.

A field 618 stores the filter result for the datagram, which is obtained from applying the filter(s) to the filter parameters for the datagram. Field 618 is reset to a known state when the routing table entry is created to indicate that the filter result is not yet available. Field 618 may be checked to determine whether the filter result is available, for block 426 in FIG. 4. The filter result, if available, is used to process/forward all fragments of the datagram. The filter result may include various types of information such as, for example, (1) whether to pass the fragments of the datagram up to a higher layer, delete the fragments, or forward the fragments to the destination host, (2) routing information for the destination host such as the interface address and gateway, if applicable, (3) link identifier for multilink interfaces, (4) tags for QoS classification, and so on.

A field 620 stores information for the fragments of the datagram, e.g., the fragment offset and payload size of each fragment. This fragment information is used to determine whether the entire datagram has been received, for block 444 in FIG. 4. Field 620 may be cleared when the routing table entry is created and thereafter populated with the MF bit, fragment offset, and payload size for each received fragment. A field 622 stores a pointer to a location in the fragment memory which stores fragments of the datagram.

Figure 7:
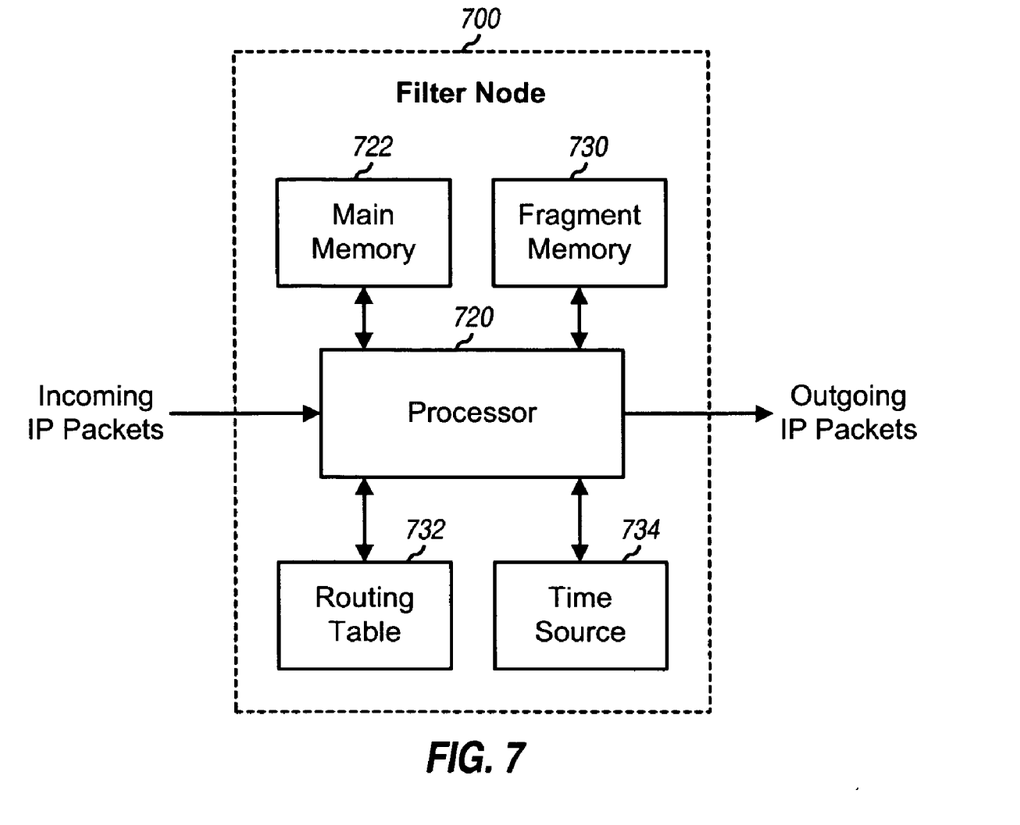
FIG. 7 shows a block diagram of the filtering node.

FIG. 7 shows a block diagram of an embodiment of a node 700 capable of filtering datagrams and routing fragments. Within node 700, a processor 720 receives IP packets and processes each received IP packet (e.g., as shown in FIG. 4). For each received IP packet, processor 720 stores the IP packet in a fragment memory 730 if a filter result is not available and processes/forwards the IP packet if the filter result is available. A main memory 722 stores data and program codes used by processor 720.

Fragment memory 730 stores IP packets for fragments of datagrams for which filter results are not available. A routing table 732 stores a table entry for each fragmented datagram currently being processed by processor 720. Processor 720 creates a new entry in routing table 732 whenever it receives a new fragmented datagram and purges the table entry if the entire datagram has been received or if the timer for the datagram expires. A time source 734 provides timing information used to update the timers for the fragmented datagrams.

Node 700 may be a device or apparatus within a core network, e.g., a router in a data network. Node 700 may also be a device or apparatus coupled to the data network. The data network may be a wireline network, a wireless network, or a combination of both types of network.

Figure 8:
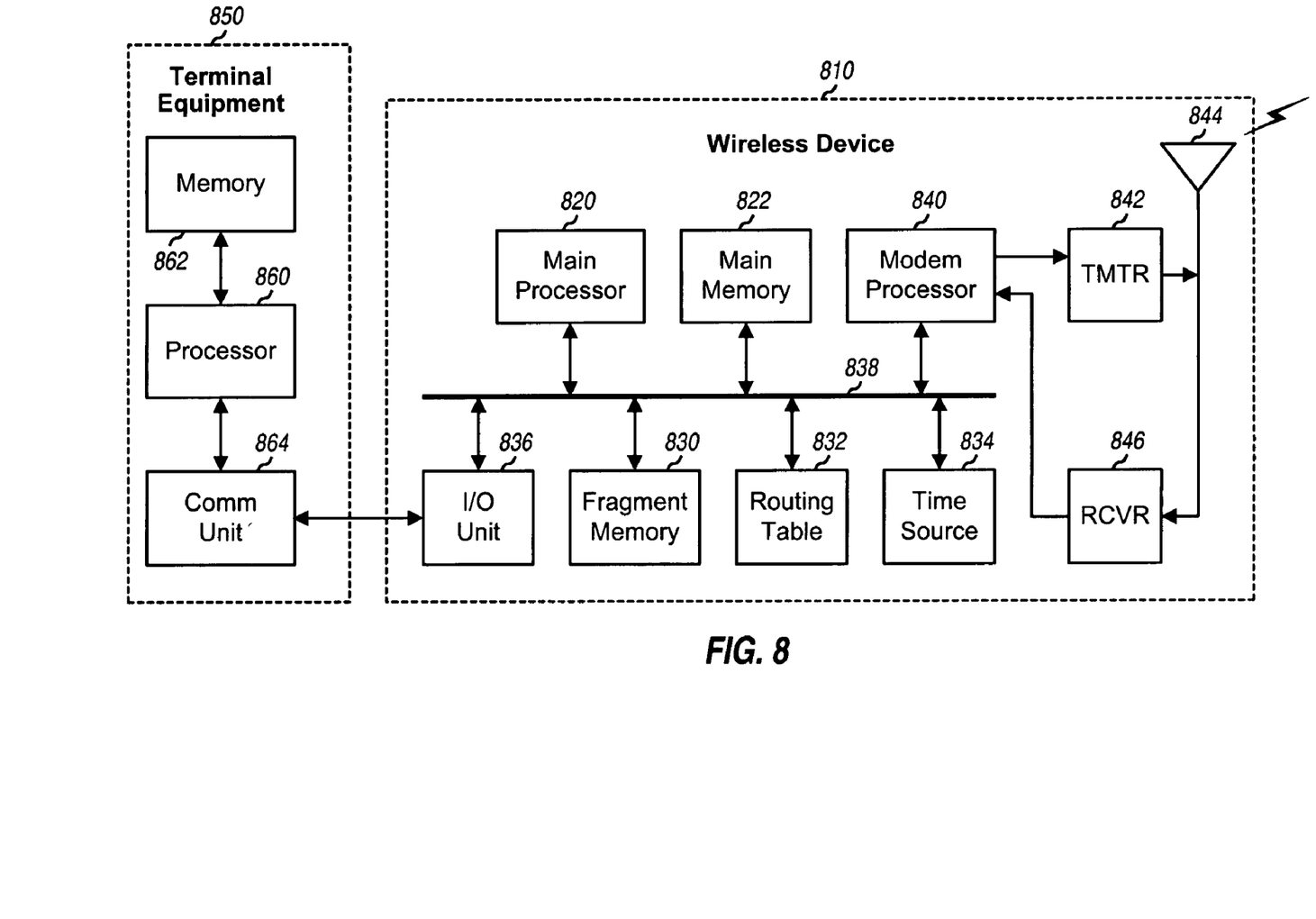
FIG. 8 shows a block diagram of a wireless device and a terminal equipment.

FIG. 8 shows a block diagram of a wireless device 810 and a terminal equipment 850. Wireless device 810 may communicate with one or more wireless communication systems such as a Code Division Multiple Access (CDMA) system, a Global System for Mobile Communications (GSM) system, and so on. A CDMA system may implement one or more CDMA standards such as IS-2000, IS-856, IS-95, Wideband-CDMA (W-CDMA), and so on. Wireless device 810 is capable of providing bi-directional communication via a transmit path and a receive path.

For the transmit path, a modem processor 840 processes (e.g., encodes and modulates) data to be transmitted by wireless device 810 and provides data chips to a transmitter unit (TMTR) 842. Transmitter unit 842 conditions (e.g., converts to analog, filters, amplifies, and frequency upconverts) the data chips and generates a modulated signal, which is transmitted via an antenna 844. For the receive path, signals transmitted by base stations in one or more systems are received by antenna 844 and provided to a receiver unit (RCVR) 846. Receiver unit 846 conditions (e.g., filters, amplifies, and frequency downconverts) the received signal, digitizes the conditioned signal, and provides data samples to modem processor 840 for demodulation and decoding.

A main processor 820 performs various functions and controls the operation of the processing units within wireless device 810. A main memory unit 822 stores data and program codes used by main processor 820. An input/output (I/O) unit 836 provides an interface to external entities, e.g., terminal equipment 850. A bus 838 interconnects various units within wireless device 810.

Wireless device 810 may also be a filtering node. In this case, a fragment memory 830 stores fragments of datagrams for which filter results are not available. A routing table 832 stores entries for fragmented datagrams being processed. A time source 834 provides timing information used to maintain timers for the fragmented datagrams.

Terminal equipment 850 may be, for example, a laptop computer, a personal digital assistant (PDA), or some other electronics unit. Terminal equipment 850 includes a processor 860 that performs processing for the terminal equipment, a memory 862 that stores data and program codes used by processor 860, and a communication unit 864 that support communication with other entities, e.g., wireless device 810.

The techniques described herein can efficiently filter fragmented datagrams. This is achieved by collecting filter parameters for each fragmented datagram as they are received and applying the one or more filters for the datagram as soon as all filter parameters for the datagram are received. The filter(s) may thus be applied quickly (e.g., on the first fragment received for the datagram) without having to wait for all fragments to be received. The techniques described herein can also efficiently route fragments. This is achieved by obtaining a filter result for each fragmented datagram as soon as all filter parameters for the datagram are received, storing the filter result in the routing table entry, and applying the filter result to each fragment subsequently received for the datagram.

The techniques described herein ensure that each fragment undergoes minimal delay when passing through the filtering node. The additional delay experienced by a fragment of a datagram may be as much as the amount of time it takes for the node to receive all filter parameters for the datagram. Subsequent fragments for the datagram may be processed/forwarded as soon as each fragment is received.

If all of the filter parameters for a datagram are carried in fragment 1 and this fragment is received first by the node, then the node does not need to store any of the fragments for the datagram. If a required filter parameter is carried in a subsequently received fragment (e.g., because fragment 1 is received out of sequence or because the filter parameter is carried in a fragment other than fragment 1), then the node may need to buffer some fragments for a short time duration until all filter parameters are received. With a proper filter design and for the common case in which the fragments are received in order, the fragments can be processed/forwarded as soon as they are received by the node. In the worst case, a required filter parameter is carried in the last fragment received for the datagram, and all fragments for the datagram need to be buffered and delayed. However, this worst-case scenario for the techniques described herein would be the nominal case for a conventional filtering scheme that applies the filter(s) only after all fragments have been received for the datagram.

IP packet filtering may be used for various applications in data environments where routing solely based on destination IP address may not be appropriate. Some exemplary filtering applications are described below.

IP packet filtering may be used to support local socket applications at a wireless device. As an example, a wireless device (e.g., a cellular phone, a wireless data card, or a wireless module capable of providing packet data service) may be coupled to a terminal equipment (e.g., a laptop computer), as shown in FIG. 8. The terminal equipment uses the wireless device to obtain IP connectivity over a wireless network, and the wireless device forwards IP packets received from the wireless network to the terminal equipment. Many wireless data networks (e.g., a CDMA network) typically assign a single IP address to the wireless device. The wireless device may then provide this IP address to the terminal equipment for use for data communication. In this case, if the wireless device receives IP packets with this IP address as the destination IP address, then the wireless device would forward these IP packets to the terminal equipment.

The simple IP address based routing described above does not support local socket applications at the wireless device. Such applications may include, for example, Mobile IP used to provide IP connectivity for the wireless device in a mobile environment, GPS for position determination, and so on. These applications may require interaction between the wireless device and the wireless network to exchange pertinent information. Thus, due to the nature of these applications, it may be more appropriate to run the applications on the wireless device instead of the terminal equipment.

The filtering and routing techniques described herein may be used to simultaneously support, with a single IP address, both (1) system applications running over local sockets at the wireless device and (2) end-user applications running at the terminal equipment. One or more filters may be defined with filter parameters that are applicable for the system applications but not the end-user applications. For example, a filter parameter may be defined for TCP port numbers used by the system applications but not the end-user applications. The filter(s) would then be applied on each datagram received by the wireless device from the wireless network to obtain a filter result for the datagram. The filter result would indicate whether the datagram should be forwarded to the terminal equipment or sent up the protocol stack at the wireless device. The IP packet filtering may thus be used to differentiate IP packets for the wireless device from those for the terminal equipment.

IP packet filtering may also be used to support different grades of quality of service (QoS) in a data network. Different types of traffic data (e.g., for the system and/or end-user applications) may be assigned different QoS grades and may be sent on different logical channels. The desired QoS of each datagram may be set by the source node and determined by a set of filter parameters. IP routers in the data network may use pre-defined filters that operate on the filter parameters for each datagram to determine which logical channel should be used for the datagram to provide the desired QoS. If all IP packets are destined to a device which has multiple logical links on the same IP interface, then IP address based routing alone would not be sufficient to determine which logical channel to use for each datagram. One or more additional fields in a datagram may be used as filter parameter(s) to route datagrams requiring different QoS grades to the appropriate logical channels.

IP packet filtering may also be used to efficiently support broadcast and multicast. To support multicast, a node joins a multicast group which is identified by a multicast IP address. Typically, all IP packets with the multicast IP address are sent to the node regardless of the transport layer port numbers for which these IP packets are intended. The node may then process these IP packets and pass all of the IP packets up to the transport layer, which may then discard unwanted IP packets. Transmission of unwanted IP packets is undesirable for a wireless data network, since precious air-link resources are used to send unwanted IP packets, which are subsequently discarded by the wireless device. An IP router in the wireless data network may use IP packet filtering to more efficiently support multicast. A filter may be defined based on transport layer port numbers or some other filter parameters. The IP router would then apply the filter to all datagrams and selectively forward only datagrams desired by the node. IP packet filtering may be applied in a similar manner to efficiently support broadcast.

IP packet filtering may also be used by packet logging tools to selectively log IP packets. Certain IP packets may be selected based on one or more filter parameters from among numerous IP packets received by a node. The selected IP packets may be logged for subsequent evaluation. IP packet filtering may also be used to implement a network emulator by simulating various network conditions by selectively duplicating, corrupting, and/or dropping IP packets.

IP packet filtering may thus be used for various filtering applications to selectively process and/or forward datagrams. For all of these filtering applications, the techniques described herein may be used to efficiently filter IP packets and route IP packets for fragmented datagrams.

The IP packet filtering may be performed by various devices in a network. For example, the IP packet filtering may be performed by a wireless device, a router in the network (e.g., to provide QoS), a standalone device (which may or may not be coupled to a terminal equipment), and so on.

Different filtering applications use different filters that may operate on the same or different sets of filter parameters. The filter parameters may be carried in the IP header, a higher layer protocol header (e.g., the TCP header), a higher layer payload, and so on, as noted above. As some examples, the following may be used as filter parameters: (1) from the IP header—the source IP address, destination IP address, subnet mask, protocol number, security information such as IPSec Security Parameter Index (SPI), type of service (e.g., in IPv4), traffic class (e.g., in IPv6), flow label (e.g., in IPv6), and so on, and (2) from the transport layer header—the source port, destination port, source port range, and destination port range. A subnet mask specifies a range of IP addresses that may be used for a subnet in a data network. In general, any field of any header or payload in any layer may be used for the filter parameters.

The filtering and routing techniques described herein may be implemented by various means. For example, these techniques may be implemented in hardware, software, or a combination thereof. For a hardware implementation, the processing units used to perform the filtering and routing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the filtering and routing techniques may be implemented with modules (e.g., procedures, functions, and so on) that perform the functions described herein. The software codes may be stored in a memory unit (e.g., memory unit 722 in FIG. 7 or memory unit 822 in FIG. 8) and executed by a processor (e.g., processor 720 in FIG. 7 or main processor 820 in FIG. 8). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing fragmented datagrams in a wireless device connected to a terminal equipment, the method comprising:
receiving at the wireless device a first data packet for a datagram;
determining if the datagram includes a plurality of fragments;
if the first data packet is a fragment, obtaining a datagram identifier comprising a concatenation of a source address, a destination address, an identification value for the datagram, and a protocol number included in the IP header for the fragment;
if the fragment is a first fragment received for the datagram, creating a table entry for the datagram in a first memory, wherein the table entry includes a first field for storing a filter result and a second field for storing a datagram identifier;
determining if the first data packet includes all of one or more filter parameters for the datagram;
if the first data packet does not include all of the one or more filter parameters for the datagram, buffering the first data packet;
receiving at the wireless device a second data packet for the datagram;
identifying at least one filter parameter for the datagram from the second data packet;
if the first and second data packets are fragments, storing the fragments and any additional received fragments of the datagram as stored fragments, each of the fragments having the same datagram identifier;
obtaining the at least one filter parameter from the second data packet;
determining the filter result for the datagram based at least in part on the at least one filter parameter from the second data packet, wherein the filter result is determined before all fragments of the datagram are received;
processing the stored fragments having the same datagram identifier based on the filter result to determine whether the stored fragments are addressed to a system application running over a local socket at the wireless device or an end-user application running at the terminal equipment; and
sending the processed fragments to a protocol stack at the wireless device or at the terminal equipment depending on where the stored fragments are determined to be addressed,
wherein the wireless device provides IP connectivity to the terminal equipment over a wireless data network using an IP address of the wireless device.

2. The method of claim 1, wherein the datagram is an Internet Protocol (IP) datagram.

3. The method of claim 2, wherein the at least one filter parameter comprises a subnet mask, a source port range, a destination port range, type of service for IP version 4 (IPv4), traffic class for IP version 6 (IPv6), flow label for IPv6, IPSec Security Parameter Index (SPI), or a combination thereof, for the IP datagram.

4. The method of claim 1, further comprising:
obtaining the at least one filter parameter from a payload associated with the first data fragment.

5. The method of claim 1, further comprising:
maintaining a timer for the datagram; and
clearing the stored fragments for the datagram after the timer expires.

6. The method of claim 1, the table entry further comprising:
a third field for a filter parameter and a fourth field for fragment information.

7. The method of claim 1, wherein the table entry for the datagram further includes a timer used to count an amount of time elapsed since the first fragment was received for the datagram.

8. The method of claim 1, further comprising:
if the filter result for the datagram is not available, storing the received fragment in a second memory.

9. The method of claim 8, wherein the table entry for the datagram further includes fifth field for storing a pointer to a location in the second memory used to store the fragments received for the datagram.

10. The method of claim 8, further comprising:
determining whether the plurality of fragments for the datagram have been received; and
if the plurality of fragments have been received, deleting the table entry in the first memory and clearing the second memory used to store the received fragments of the datagram.

11. The method of claim 1, wherein said determining the filter result for the datagram comprises:
determining whether the at least one filter parameter is available, and
applying at least one filter to the at least one filter parameter, if available, to obtain the filter result.

12. The method of claim 1, further comprising:
detecting the first data fragment carrying the at least one filter parameter for the datagram.

13. The method of claim 12, wherein the detecting is performed based on a known value for a field in a protocol header for the first fragment of the datagram.

14. The method of claim 1, wherein the at least one filter parameter comprises a subnet mask, a source port range, a destination port range, quality of service (QoS) information, type of service, traffic class, flow label, security information, or a combination thereof.

15. The method according to claim 1, wherein the first data packet does not include a filter parameter, and the filter result is based entirely on one or more filter parameters obtained from the second data packet.

16. The method according to claim 1, further comprising:
obtaining at least one filter parameter from the first data packet; and
storing the filter parameter obtained from the first data packet,
wherein the filter result is based on a combination of the at least one filter parameter from the first data packet and the at least one filter parameter from the second data packet.

17. The method according to claim 1, wherein the filter result further comprises an additional filter result to perform at least one of logging selective packets, supporting broadcast and multicast, determining whether to pass the datagram fragments to a higher layer, determining whether to delete the datagram fragments, or identifying a link for multilink interfaces.

18. An apparatus for processing fragmented datagrams in a wireless device connected to a terminal equipment, comprising:
a processor configured to:
receive a first data packet for a datagram;
determine if the datagram includes a plurality of fragments;
if the first data packet is a fragment, obtaining a datagram identifier comprising a concatenation of a source address, a destination address, and an identification value for the datagram;
if the fragment is a first fragment received for the datagram, create a table entry for the datagram in a first memory, wherein the table entry includes a first field for storing filter result and a second field for storing the datagram identifier;
determine if the first data packet includes all of one or more filter parameters for the datagram;
if the first data packet does not include all of the one or more filter parameters for the datagram, buffer the first data packet;
receive a second data packet for the datagram;
identify at least one filter parameter for the datagram from the second data packet;
if the first and second data packets are fragments, store the fragments and any additional received fragments of the datagram as stored fragments;
obtain the at least one filter parameter from the second data packet;
determine the filter result for the datagram based at least in part on the at least one filter parameter from the second data packet, wherein the filter result is determined before all fragments of the datagram are received;
process the stored fragments having the same datagram identifier based on the filter result to determine whether the stored fragments are addressed to a system application running over a local socket at the wireless device or an end-user application running at the terminal equipment; and
send the processed fragments to a protocol stack at the wireless device or at the terminal equipment depending on where the stored fragments are determined to be addressed,
wherein the wireless device provides IP connectivity to the terminal equipment over a wireless data network using an IP address of the wireless device; and
a first memory configured to store the filter result for the datagram.

19. The apparatus of claim 18, further comprising:
a second memory configured to store fragments received for the datagram before the filter result is available.

20. The apparatus of claim 19, wherein the processor is further configured to
determine whether the plurality of fragments for the datagram have been received; and
clear the fragments stored in the second memory for the datagram if the plurality of fragments for the datagram have been received.

21. The apparatus of claim 19, wherein the processor is further configured to
maintain a timer for the datagram; and
clear the stored fragments for the datagram after the timer expires.

22. The apparatus of claim 18, wherein the processor is further configured to
obtain the at least one filter parameter from a payload associated with the first data fragment.

23. The apparatus of claim 18, wherein the processor is further configured to
determine whether the plurality of fragments for the datagram have been received, and
clear the table entry in the first memory for the datagram if the plurality of fragments for the datagram have been received.

24. The apparatus of claim 18, wherein the plurality of fragments of the datagram are sent in a wireless transmission.

25. The apparatus according to claim 18, wherein the first data packet does not include a filter parameter, and the filter result is based entirely on one or more filter parameters obtained from the second data packet.

26. The apparatus according to claim 18, wherein the processor is further configured to:
obtain at least one filter parameter from the first data packet; and
store the filter parameter obtained from the first data packet,
wherein the filter result is based on a combination of the at least one filter parameter from the first data packet and the at least one filter parameter from the second data packet.

27. The apparatus according to claim 18, wherein the filter result further comprises an additional filter result to perform at least one of logging selective packets, supporting broadcast and multicast, determining whether to pass the datagram fragments to a higher layer, determining whether to delete the datagram fragments, or identifying a link for multilink interfaces.

28. The apparatus of claim 18, wherein the processor is further configured to:
detect the first fragment carrying the at least one filter parameter for the datagram based on a known value for a field in a protocol header for the first fragment of the datagram.

29. An apparatus for processing fragmented datagrams in a wireless device connected to a terminal equipment, the apparatus comprising:
means for receiving a first data packet for a datagram;
means for determining if the datagram includes a plurality of fragments;
means for obtaining a datagram identifier comprising a concatenation of a source address, a destination address, and an identification value for the datagram, if the data packet is a fragment;
means for creating a table entry for the datagram in a first memory, wherein the table entry includes a first field for storing a filter result and a second field for storing a datagram identifier, if the fragment is a first fragment received for the datagram;
means for determining if the first data packet includes all of one or more filter parameters for the datagram;
means for buffering the first data packet, if the first data packet does not include all of the one or more filter parameters for the datagram;
means for receiving a second data packet for the datagram;
means for identifying at least one filter parameter for the datagram from the second data packet;
means for storing, if the first and second data packets are fragments, the fragments and any additional received fragments of the datagram as stored fragments, each of the fragments having the same datagram identifier;
means for obtaining the at least one filter parameter from the second data packet;
means for determining the filter result for the datagram based at least in part on the at least one filter parameter from the second data packet, wherein the filter result is determined before all fragments of the datagram are received;
means for processing the stored fragments having the same datagram identifier based on the filter result to determine whether the stored fragments are addressed to a system application running over a local socket at the wireless device or an end-user application running at the terminal equipment; and
means for sending the processed fragments to a protocol stack at the wireless device or at the terminal equipment depending on where the stored fragments are determined to be addressed,
wherein the wireless device provides IP connectivity to the terminal equipment over a wireless data network using an IP address of the wireless device.

30. The apparatus of claim 29, further comprising:
means for obtaining the at least one filter parameter from a payload associated with the first data fragment.

31. The apparatus of claim 29, further comprising:
means for maintaining a timer for the datagram; and
means for clearing the stored fragments for the datagram after the timer expires.

32. The apparatus according to claim 29, wherein the first data packet does not include a filter parameter, and the filter result is based entirely on one or more filter parameters obtained from the second data packet.

33. The apparatus according to claim 29, further comprising:
means for obtaining at least one filter parameter from the first data packet; and
means for storing the filter parameter obtained from the first data packet,
wherein the filter result is based on a combination of the at least one filter parameter from the first data packet and the at least one filter parameter from the second data packet.

34. The apparatus according to claim 29, wherein the filter result further comprises an additional filter result to perform at least one of logging selective packets, supporting broadcast and multicast, determining whether to pass the datagram fragments to a higher layer, determining whether to delete the datagram fragments, or identifying a link for multilink interfaces.

35. A non-transitory processor readable medium for storing instructions for configuring a wireless device connected to a terminal equipment, the readable medium comprises instructions to:
receive a first data packet for a datagram;
determine if the datagram includes a plurality of fragments;
if the data packet is a fragment, obtaining a datagram identifier comprising a concatenation of a source address, a destination address, and an identification value for the datagram;
if the fragment is a first fragment received for the datagram, create a table entry for the datagram in a first memory, wherein the table entry includes a first field for storing a filter result and a second field for storing the datagram identifier;
determine if the first data packet includes all of one or more filter parameters for the datagram;
if the first data packet does not include all of the one or more filter parameters for the datagram, buffer the first data packet; receive a second data packet;
identify at least one filter parameter for the datagram from the second data packet;
if the first and second data packets are fragments, store the fragments and any additional received fragments of the datagram as stored fragments, each of the fragments having the same datagram identifier;
obtain the at least one filter parameter from the second data packet;
determine the filter result for the datagram based at least in part on the at least one filter parameter from the second data packet, wherein the filter result is determined before all fragments of the datagram are received;
process the stored fragments based on the filter result to determine whether the stored fragments are addressed to a system application running over a local socket at the wireless device or an end-user application running at the terminal equipment; and
send the processed fragments to a protocol stack at the wireless device or at the terminal equipment depending on where the stored fragments are determined to be addressed,
wherein the wireless device provides IP connectivity to the terminal equipment over a wireless data network using an IP address of the wireless device.

36. The non-transitory processor readable medium of claim 35 and further for storing instructions configured to:
obtain the at least one filter parameter from a payload associated with the first data fragment.

37. The non-transitory processor readable medium for storing instructions according to claim 35, wherein the first data packet does not include a filter parameter, and the filter result is based entirely on one or more filter parameters obtained from the second data packet.

38. The non-transitory processor readable medium for storing instructions according to claim 35, further for storing instructions configured to:
obtain at least one filter parameter from the first data packet; and store the filter parameter obtained from the first data packet,
wherein the filter result is based on a combination of the at least one filter parameter from the first data packet and the at least one filter parameter from the second data packet.

39. The non-transitory processor readable medium according to claim 35, wherein the filter result further comprises an additional filter result to perform at least one of logging selective packets, supporting broadcast and multicast, determining whether to pass the datagram fragments to a higher layer, determining whether to delete the datagram fragments, or identifying a link for multilink interfaces.

40. At least one processor for processing fragmented datagrams in a wireless device connected to a terminal equipment, the processor comprising:
a first processing element for receiving a first data packet for a datagram;
a second processing element for determining if the datagram includes a plurality of fragments;
a third processing element for obtaining a datagram identifier comprising a concatenation of a source address, a destination address, an identification value for the datagram, and a protocol number included in the IP header for the fragment, if the first data packet is a fragment;
a fourth processing element for creating a table entry for the datagram in a first memory, wherein the table entry includes a first field for storing a filter result, including a quality of service filter result, and a second field for storing a datagram identifier, if the fragment is a first fragment received for the datagram;
a fifth processing element for determining if the first data packet includes all of one or more filter parameters for the datagram;
a sixth processing element for buffering the first data packet, if the first data packet does not include all of the one or more filter parameters for the datagram;
a seventh processing element for receiving a second data packet for the datagram;
an eighth processing element for identifying at least one filter parameter for the datagram from the second data packet;
a ninth processing element for storing the fragments and any additional received fragments of the datagram as stored fragments, if the first and second data packets are fragments, each of the fragments having the same datagram identifier;
a tenth processing element for obtaining the at least one filter parameter from the second data packet;
an eleventh processing element for determining the quality of service filter result for the datagram based at least in part on the at least one filter parameter from the second data packet, wherein the quality of service filter result is determined before all fragments of the datagram are received;
a twelfth processing element for processing the stored fragments having the same datagram identifier based on the quality of service filter result to determine whether the stored fragments are addressed to a system application running over a local socket at the wireless device or an end-user application running at the terminal equipment; and
a thirteenth processing element for sending the processed fragments to a protocol stack at the wireless device or at the terminal equipment depending on where the stored fragments are determined to be addressed,
wherein the wireless device provides IP connectivity to the terminal equipment over a wireless data network using an IP address of the wireless device.

41. The at least one processor according to claim 40, wherein the filter result further comprises an additional filter result to perform at least one of logging selective packets, supporting broadcast and multicast, determining whether to pass the datagram fragments to a higher layer, determining whether to delete the datagram fragments, or identifying a link for multilink interfaces.

* * * * *